(12) United States Patent
Rajendran et al.

(10) Patent No.: US 11,092,686 B2
(45) Date of Patent: Aug. 17, 2021

(54) METHOD, APPARATUS AND DEVICE FOR DOPPLER COMPENSATION IN A TIME SWITCHED MIMO RADAR SYSTEM

(71) Applicant: Steradian Semiconductors Private Limited, Bangalore (IN)

(72) Inventors: Gireesh Rajendran, Bangalore (IN); Apu Sivadas, Bangalore (IN)

(*) Notice: Subject to any disclaimer, the term of this patent is extended or adjusted under 35 U.S.C. 154(b) by 268 days.

(21) Appl. No.: 16/210,007

(22) Filed: Dec. 5, 2018

(65) Prior Publication Data

US 2020/0088867 A1 Mar. 19, 2020

(30) Foreign Application Priority Data

Sep. 19, 2018 (IN) .............................. 201841035348

(51) Int. Cl.
*G01S 13/58* (2006.01)
*H04B 7/0413* (2017.01)
*G01S 13/89* (2006.01)

(52) U.S. Cl.
CPC .......... *G01S 13/581* (2013.01); *G01S 13/588* (2013.01); *G01S 13/589* (2013.01); *G01S 13/89* (2013.01); *H04B 7/0413* (2013.01)

(58) Field of Classification Search
CPC .... G01S 13/581; G01S 13/588; G01S 13/589; G01S 13/89; H04B 7/0413
USPC ....................................................... 342/104
See application file for complete search history.

(56) References Cited

U.S. PATENT DOCUMENTS

| | | | | |
|---|---|---|---|---|
| 3,952,302 A | * | 4/1976 | Mullins | G01S 13/5242 342/161 |
| 4,134,113 A | * | 1/1979 | Powell | G01S 13/9092 342/25 C |
| 4,549,184 A | * | 10/1985 | Boles | F41G 5/18 342/25 B |
| 4,924,235 A | * | 5/1990 | Fujisaka | G01S 13/42 342/158 |
| 5,208,600 A | * | 5/1993 | Rubin | G01S 13/951 342/26 D |
| 5,409,010 A | * | 4/1995 | Beach | A61B 8/06 600/455 |
| 5,663,720 A | * | 9/1997 | Weissman | G01S 13/91 340/905 |
| 5,760,734 A | * | 6/1998 | Urkowitz | G01S 7/414 342/159 |

(Continued)

FOREIGN PATENT DOCUMENTS

| | | | | |
|---|---|---|---|---|
| EP | 2071357 A1 | * | 6/2009 | ............. G01S 7/352 |
| EP | 3014297 A1 | * | 5/2016 | ........... H01Q 1/3233 |
| WO | WO-2016002858 A1 | * | 1/2016 | ............. G01S 3/043 |

*Primary Examiner* — Vladimir Magloire
*Assistant Examiner* — Nuzhat Pervin (57) ABSTRACT

A method in a time switched multiple input and multiple output (MIMO) radar system comprising, receiving (610) from an antenna array a plurality of data points representing a radar signal reflected from plurality of objects, forming (620) a first set of beams from the plurality of data points, wherein the first set of beams are making a first set angles with a normal to the antenna array, detecting a set of objects (410A-L) from the first set of beams, determining (630) a set of Doppler frequencies of the set of objects, computing (650) a self-velocity representing a velocity of the antenna array from the set of Doppler frequencies and the first set of angles, and correcting (660) the plurality of data points using the self-velocity and a second set of angles to generate plurality of corrected data points.

8 Claims, 6 Drawing Sheets

(56) References Cited

U.S. PATENT DOCUMENTS

| | | | | |
|---|---|---|---|---|
| 5,923,281 | A * | 7/1999 | Vopat | G01S 13/60 342/117 |
| 5,928,153 | A * | 7/1999 | Chiang | A61B 8/06 600/454 |
| 7,548,185 | B2 * | 6/2009 | Sheen | G01S 13/89 342/22 |
| 8,224,387 | B2 * | 7/2012 | Bishop | H04B 7/0617 455/562.1 |
| 8,299,958 | B2 * | 10/2012 | Kemkemian | G01S 13/426 342/107 |
| 9,304,198 | B1 * | 4/2016 | Doerry | G01S 5/0247 |
| 9,689,967 | B1 * | 6/2017 | Stark | H04B 17/309 |
| 10,557,931 | B2 * | 2/2020 | Schoor | G01S 13/584 |
| 2008/0268775 | A1 * | 10/2008 | Bishop | H04B 7/18515 455/13.3 |
| 2008/0316090 | A1 * | 12/2008 | Shirakawa | G01S 13/584 342/195 |
| 2009/0085800 | A1 * | 4/2009 | Alland | G01S 7/034 342/25 R |
| 2009/0153395 | A1 * | 6/2009 | Morinaga | G01S 13/4454 342/175 |
| 2011/0140952 | A1 * | 6/2011 | Kemkemian | G01S 13/426 342/146 |
| 2015/0295628 | A1 * | 10/2015 | Bach | H04B 7/0413 370/337 |
| 2015/0331086 | A1 * | 11/2015 | Hassen | G01S 13/02 342/175 |
| 2017/0131393 | A1 * | 5/2017 | Schoor | G01S 13/42 |
| 2019/0216430 | A1 * | 7/2019 | Hoctor | A61B 8/461 |
| 2019/0250249 | A1 * | 8/2019 | Raphaeli | G01S 13/284 |
| 2019/0377062 | A1 * | 12/2019 | Barkan | G01S 7/295 |
| 2020/0049812 | A1 * | 2/2020 | Jansen | G01S 7/358 |

\* cited by examiner

METHOD, APPARATUS AND DEVICE FOR DOPPLER COMPENSATION IN A TIME SWITCHED MIMO RADAR SYSTEM

CROSS REFERENCES TO RELATED APPLICATIONS

This application claims priority from Indian patent application No. 201841035348 filed on Sep. 19, 2018 which is incorporated herein in its entirety by reference.

BACKGROUND

Technical Field

Embodiments of the present disclosure relate to high resolution radar system and in particular relate to a method, apparatus and device for Doppler compensation in a time switched MIMO Radar System.

Related Art

Radar systems are generally employed for object detection and increasingly used in various automotive applications such as for driver assistance, obstacle detection, avoidance, and navigation of drones/UAVs for example. As is well known, Radars can detect surrounding obstacles or objects and send the relevant information like distance, relative position, and direction and velocity of the object that are in motion to a controller (software or hardware) or to a decision making units in the automotive device like UAV, drone, driver assistance.

In some applications multiple input multiple output (MIMO) antenna arrays are employed to transmit and receive Radar signal. The radar signal transmitted through antennas generally is in the form of varying frequency signal for a fixed duration referred to as chirp as is well known in the art. The antenna array enables formation of an RF signal beam both for transmitting and receiving radar signal. In that, a time shifted (phase shifted) radar signals are transmitted/received over the antennas to steer the beam in desired direction as is well known in the art. A two or three dimensional object shape and location is determined by steering the beam over a range/area.

A relative movement between the antennas and the objects in time switched MIMO causes Doppler frequency shift (Effect) in the received signals thereby drifting the beam from its actual or desired direction leading to inaccurate detection and location/direction of the object. One conventional radar system with Doppler compensation is described in U.S. Pat. No. 7,474,262 which incorporated herein by reference. Such conventional compensation technique may be suitable only when a number of objects detected are fewer in number.

SUMMARY

According to an aspect of the present disclosure, a method in a time switched multiple input and multiple output (MIMO) radar system comprising, receiving (610) from an antenna array a plurality of data points representing a radar signal reflected from plurality of objects, forming (620) a first set of beams from the plurality of data points, wherein the first set of beams are making a first set angles with a normal to the antenna array, detecting a set of objects (410A-L) from the first set of beams, determining (630) a set of Doppler frequencies of the set of objects, computing (650) a self-velocity representing a velocity of the antenna array from the set of Doppler frequencies and the first set of angles, and correcting (660) the plurality of data points using the self-velocity and a second set of angles to generate plurality of corrected data points.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
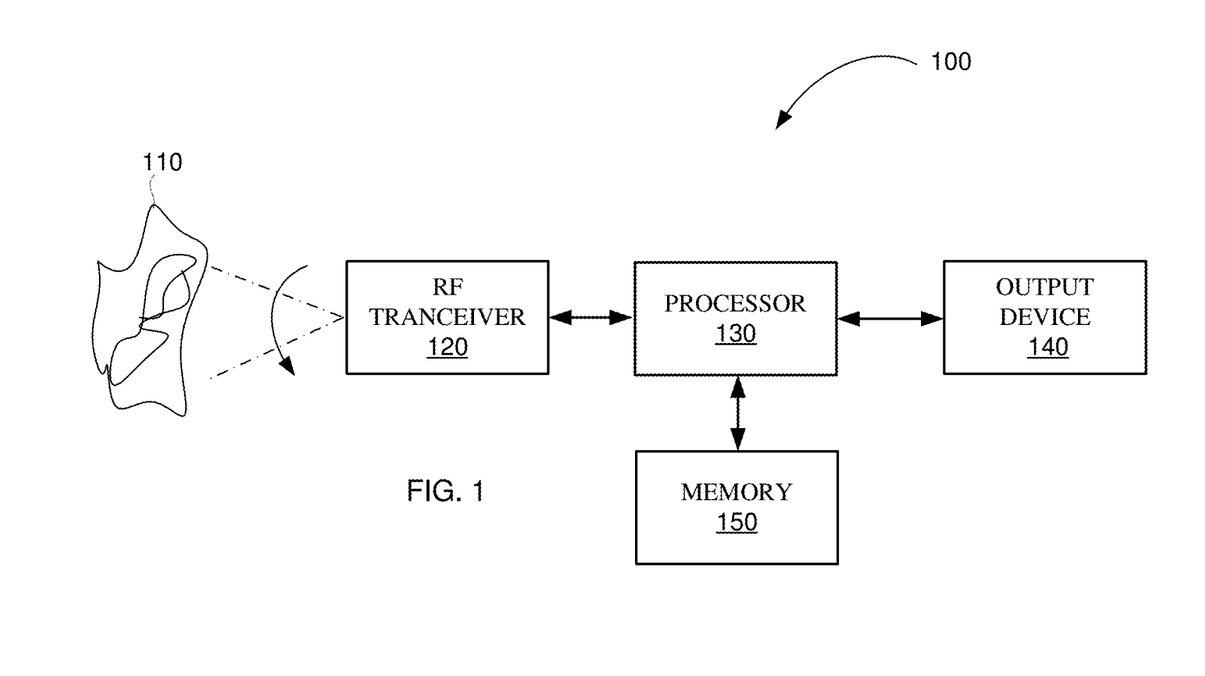
FIG. 1 is a block diagram of an example system 100 (environment) in which various aspects of the present invention may be seen.

FIG. 1 is a block diagram of an example system 100 (environment) in which various aspects of the present invention may be seen. The environment is shown comprising an object 110, Radio Frequency (RF) transceiver 120, processor 130, output device 140 and memory 150. Each element in the system 100 is further described below.

RF transceiver 120 transmits a radar (RF) signal over a desired direction(s) and receives a reflected radar signal that is reflected by the object 110. In one embodiment, the RF transceiver 120 may employ multiple (one or more) receiving antennas to receive the reflected RF signal and multiple (one or more) transmitting antenna for transmitting the radar signal. Accordingly, the transceiver 120 may employ these multiple transmitting/receiving antennas in several of multiple input and multiple output (MIMO) configurations to form desired transmitting and receiving RF signal beam (often referred to as Beam forming) to detect objected from the reflected signal. The object 110 may comprise a terrain, terrain projections, single object, cluster of objects, multiple disconnected objects, stationary object, moving object, live objects etc.

Processor 130 conditions and process the received reflected RF signal to detect one or more objects (for example 110) and determine one or more properties of the objects. The properties of the object thus determined (like shape, size, relative distance etc.) are provided to the output device 140. In an embodiment, the processor 130 comprises signal conditioner to perform signal conditioning operations and provides the conditioned RF signal for digital processing. The memory 150 may store RF signal like samples of the reflected RF signal for processing. The processor 130 may temporarily store received data, signal samples, intermediate data, results of mathematical operations, etc., in the memory 150 (such as buffers, registers). In an embodiment, processor 130 may comprise group of signal processing blocks each performing the specific operations on the received signal and together operative to detect object and its characteristics/properties.

The output device 140 comprises navigation control electronics, display device, decision making electronic circuitry and other controllers respectively for navigation, display and further processing the received details of the object. Accordingly, the system 100 may be deployed as part of unmanned vehicles, driver assistant systems for example for obstacle detection, navigation and control and in particular for terrain mapping.

In an embodiment, the RF transceiver 120, processor 130, and memory 150 are implemented as part of an integrated circuit integrated with other functionality and/or as a single chip integrated circuit with interfaces for external connectivity like the output device 140. The manner in which the transceiver 120 and the processor 130 (together referred to as Radar transceiver) may be implemented in an embodiment is further described below.

Figure 2:
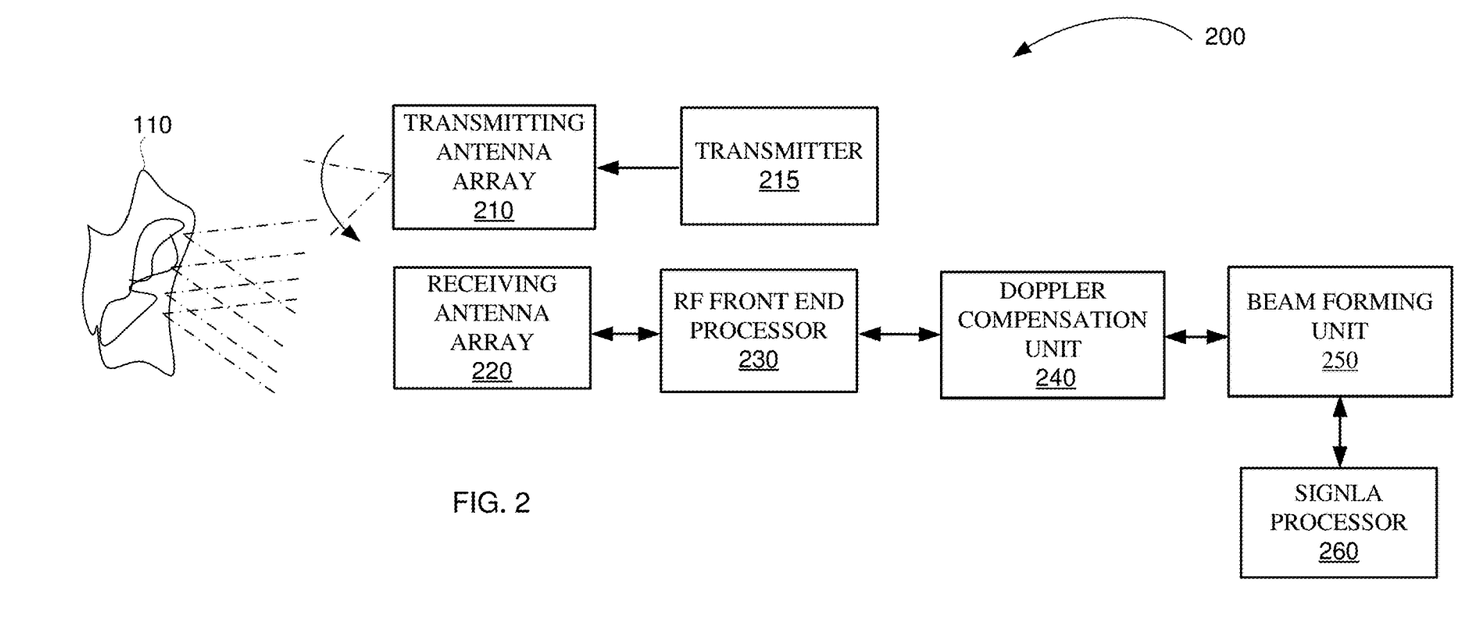
FIG. 2 is an example Radar transceiver for object detection and recognition in an embodiment.

FIG. 2 is an example Radar transceiver for object detection and recognition in an embodiment. The Radar transceiver 200 is shown comprising transmitting antenna array 210, transmitter block 215, receiving antenna array 220, RF front end processor 230, Doppler compensation unit 240, beam forming unit 250 and signal processor 260. Each element is described in further detail below.

The transmitting antenna array 210 and the transmitter 215 operate in conjunction to transmit RF signal over a desired direction. The transmitting antenna array is employed to form a transmit beam with an antenna aperture to illuminate objects at suitable distance and of suitable size. Various known beam forming technique may be employed for changing the illuminated region. The transmitting antenna array 210 may comprise one dimensional transmitting antennas, array, and two-dimensional array of transmitting antennas. Accordingly, the transmitter 215 selectively activates one or more antennas to form RF beam over the object area. In one embodiment, the transmitter 215 employ time switched MIMO configuration. In that, transmitter antenna is switched one by one transmitting the radar signal sequentially at a predetermined time interval/time delay.

Receiving antenna array 220 comprises antenna elements arranged in rows and columns with each element capable of receiving reflected RF signal. For example, an M number of antenna elements may be arranged in U rows and V columns forming a two dimensional array of U×V antenna elements. The RF signal received on each element is provided to the RF front end processor 230. In case of time switched MIMO configuration, the M antenna elements in the receiving antenna array 220 may receive P number of time switched radar signals over one transmit sequence, there by receiving an M×P Radar signals over one transmit sequence.

The RF front end processor 230 receives the RF signal from the receiving antenna array 220 and selectively performs at least one of sample, multiplex, addition, analog to digital conversion for example, on the sequence of RF signal received from the antenna array elements. The digitised signals representing the RF signal received on the antenna array 220 elements is provided to the Doppler compensation unit 240. For example, the RF front end processor 230 may generate N samples of each M×P Radar signals received on the receive antenna array and thereby generating M×P×N Samples of digital data point.

The Doppler compensation unit 240 compensate digitised signal received from the RF front end processor 230 with a compensation factor that counter the Doppler shift due to relative movement of the object and the antenna array 220. The Doppler compensated digital signal from the unit 240 is provided to beamforming unit 250. The beamforming unit 250 generates beams from the compensated digital signal to determine the object shape and position. In one embodiment, the beamforming unit 250 is employed to determine a terrain often referred to as terrain imaging. The manner in which the Doppler shift is compensated in an embodiment is further described below.

Figure 3:
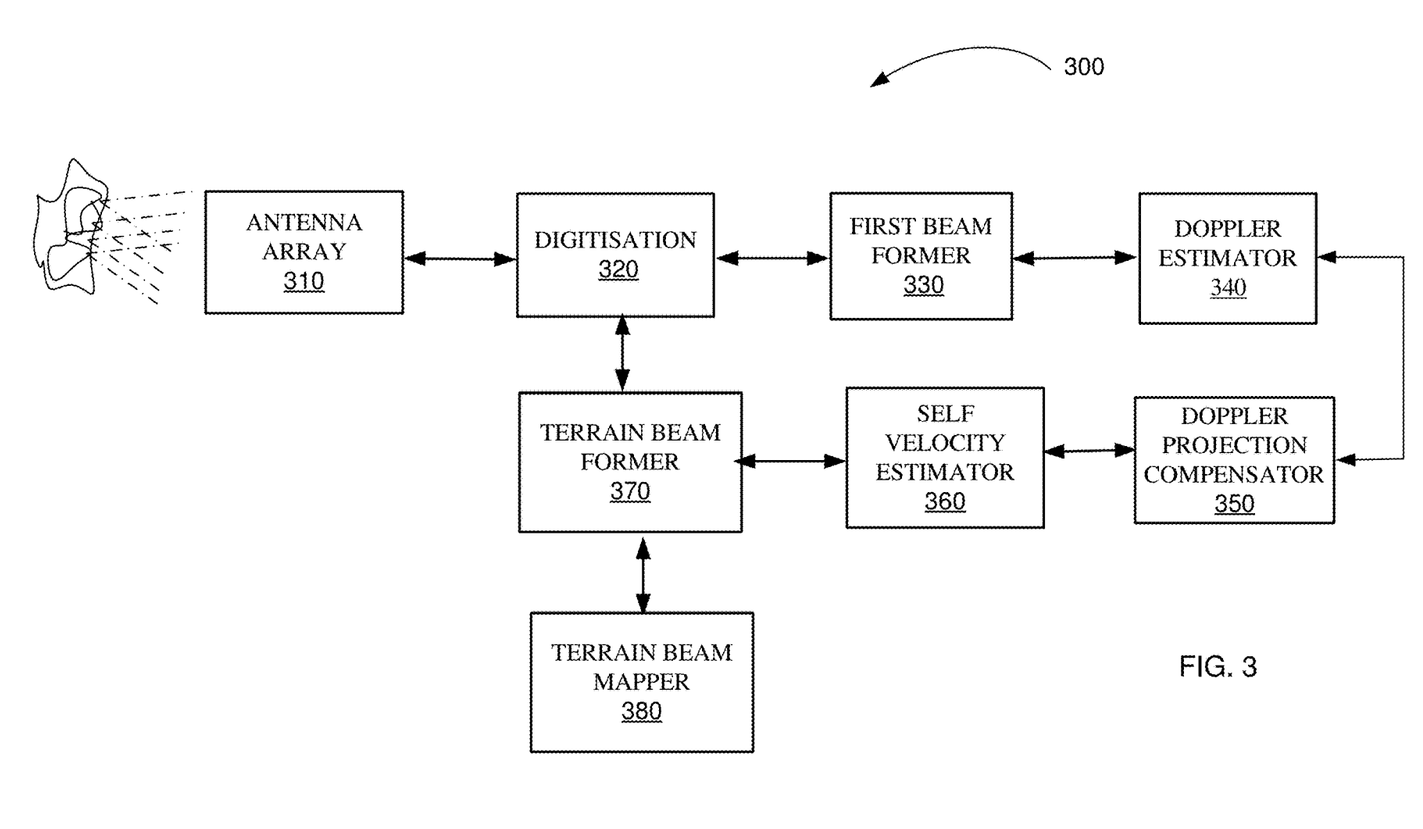
FIG. 3 is a block diagram of terrain detection system in one embodiment.

FIG. 3 is a block diagram of terrain detection system in one embodiment. The terrain detection system 300 may be employed for imaging of a terrain by mounting the terrain detection system 300 on a vehicle. The Terrain detection system 300 shown comprising antenna array 310, digitisation block 320, first beam former 330, Doppler estimator 340, Doppler projection compensator 350, self-velocity estimator 360, terrain beamforming correction unit 370, terrain beam former 380. Each block is described in further detail below.

The antenna array 310 transmits and receives radar signal and operates similar to the antenna array 210/220. The antenna array 310 may be implemented on a printed circuit board (PCB) on which other elements (320-390) may be interfaced through connecting pads/microwave strips for propagating the received RF signal. Alternatively, the antennas in the antenna array 310 are formed on a semiconductor substrate as part of an integrated circuit. Further antenna array may be deployed on any other known manner.

The digitisation and range mapping block 320 converts the received analog RF signal to set of digital data corresponding to the reflections from objects at each distance. For Frequency modulated continuous wave (FMCW) based radar systems, the range mapping is achieved by an FFT on the digitised samples. Accordingly, signal received on each antenna element is converted to corresponding digital data points (here onwards referred to as data point). The digitisation block may perform various signal conditioning operations as described with respect to block 230 to generate M×P×N digital data points.

The first beam former 330 performs beam forming on the received digital data point. In one embodiment, the beam former 330 forms set of beams from the radar signal received on M antenna element for every time switched instances. For example, the first beam former may perform summation of the data point corresponding to M number of receiving antenna elements to form a one dimensional set of beams. Alternatively, first beam former 330 may perform K point FFT on the M radar signal received on the receiving antenna elements at one time instance. Thus, a K number beams in K directions are generated for every time switched instances P. Thus creating K×P×N number of beams in one transmits time switching sequence.

The Doppler estimator 340 estimates the set of Doppler frequencies corresponding to set of object detected from beams received. The Doppler frequency may be estimated using any known technique. For example, the Doppler frequency may be estimated for K beams sweeping across the P time switched sequences in N range bins. Thus, generating a K×N number of Doppler frequencies. In other words, the relative change in position of the set of objects may be measured through the P time switched successive radar signal transmitted at different time interval.

The Doppler projection compensator 350 generates a compensated set of Doppler frequencies of the set of objects for which Doppler frequencies are determined in the Doppler estimator 340. In one embodiment, each Doppler frequencies K×N is multiplied with parameter that is function of an angle of the respective beam K.

The self-velocity estimator 360 estimates the self-velocity of the antenna array from the set of compensated Doppler frequency. In that, the self-velocity estimator 360 may consider the objects detected as stationary. Thus, translating the Doppler frequency of each object into the relative motion due to its own velocity in the reference direction.

Figure 4A:
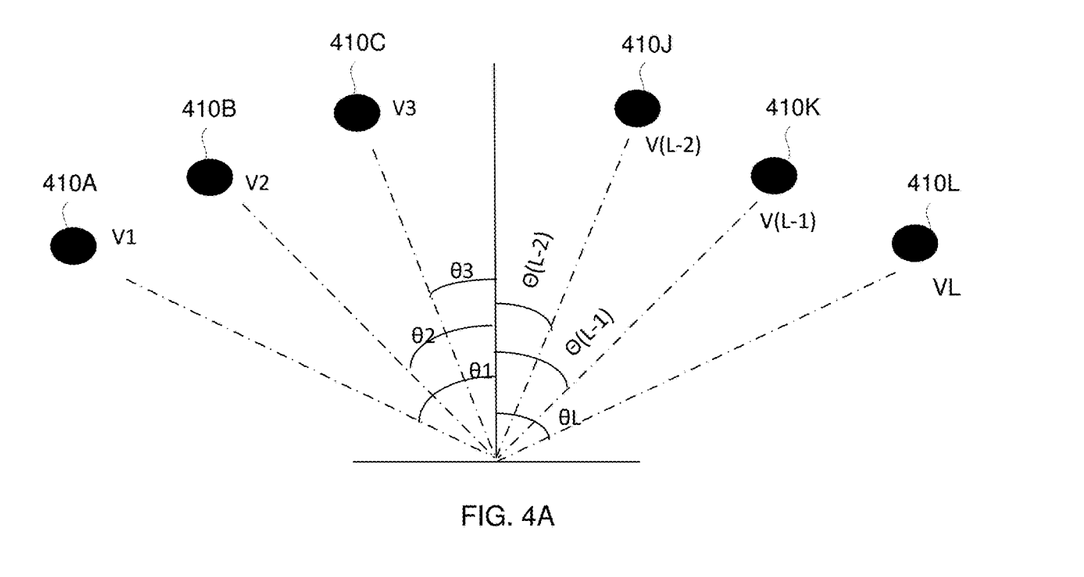
FIG. 4A illustrates the manner in which the self-velocity of the antenna array is determined in one embodiment.
Figure 4B:
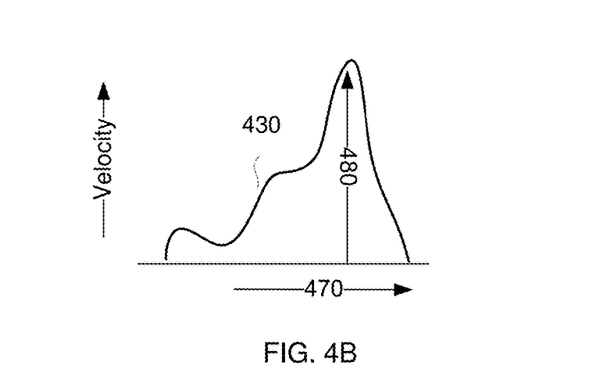
FIG. 4B illustrates the curve representing the projected Doppler velocities of the objects.

FIG. 4A illustrates the manner in which the self-velocity of the antenna array is determined in one embodiment. As shown there, the objects 410A-L represents the objects detected by K beams in the K directions. The objects 410A-L is shown with the estimated Doppler velocity v1-vL. The angles θ1-θL represents the angles made by the beams in which 410A-L objects are detected. FIG. 4B illustrates the curve representing the projected Doppler velocities of the objects 410A-L. For example, each Doppler velocity v1-vL is divided with cosine of the respective angles θ1-θL and the resulting projected velocities variation is presented as curve 430. In that, Y-axis represents the velocity; X-axis (470) represents number of objects and/or the number of occurrence, and 480 representing the maximum probable value in the distribution 430. In one embodiment, the self-velocity estimator 360 sets the self-velocity equal to the maximum probable value 480 in the distribution.

Continuing with reference to FIG. 3, the terrain beam former 370 operates on the M×P×N dataset, (recalling where M represents the number of simultaneous received signals in one switching instant, P represents the number of time switching and N denotes the number of range partitions or bins) to produce say D×N beam formed outputs. The self-velocity is used to form a self-doppler corrected beam forming co-efficents of size D×P that operates on the M×P×N dataset to produce D×N beam formed outputs. That is, one unique correction co-efficient per direction and switching instant, common across range N. The number of beams formed directions D can be same or higher than the K directions used during self-velocity estimation. For example, if the P time switched signals are generated from unique P transmit antennas then it is possible to have D=M×P unique beam directions, unique as in low correlation between beam outputs. This beam former is referred to as terrain beam former since it will provide high signal gain for reflections from objects that are deemed stationary while the radar is moving at a velocity estimated as self-velocity.

As a result, Doppler correction is made independent of number of object being detected and the complexity remains same even when larger number of objects or when a terrain is being mapped. In particular, It is possible to produce D (same or higher than K) terrain beam former without having to detect Doppler for each of the D directions. Further, velocity of the antenna and in turn the velocity of vehicle is determined with a higher precession that otherwise is not achieved in the state of art navigational technology such as GPS (Global Positioning system).

For example, the self-velocity estimator 360 determine the velocity of the vehicle with a precision set as a fraction of the wave length of the radar signal and the precision of time elapsed between antenna array switching. For instance, an 80 GHz radar with 3.75 mm wave length with no error in time switching provides self-velocity with a sub millimetre precision. As a result, drift/shift/squint in the beams formed are substantially reduced leading to more accurate detection and location of objects, terrain etc.

Figure 5:
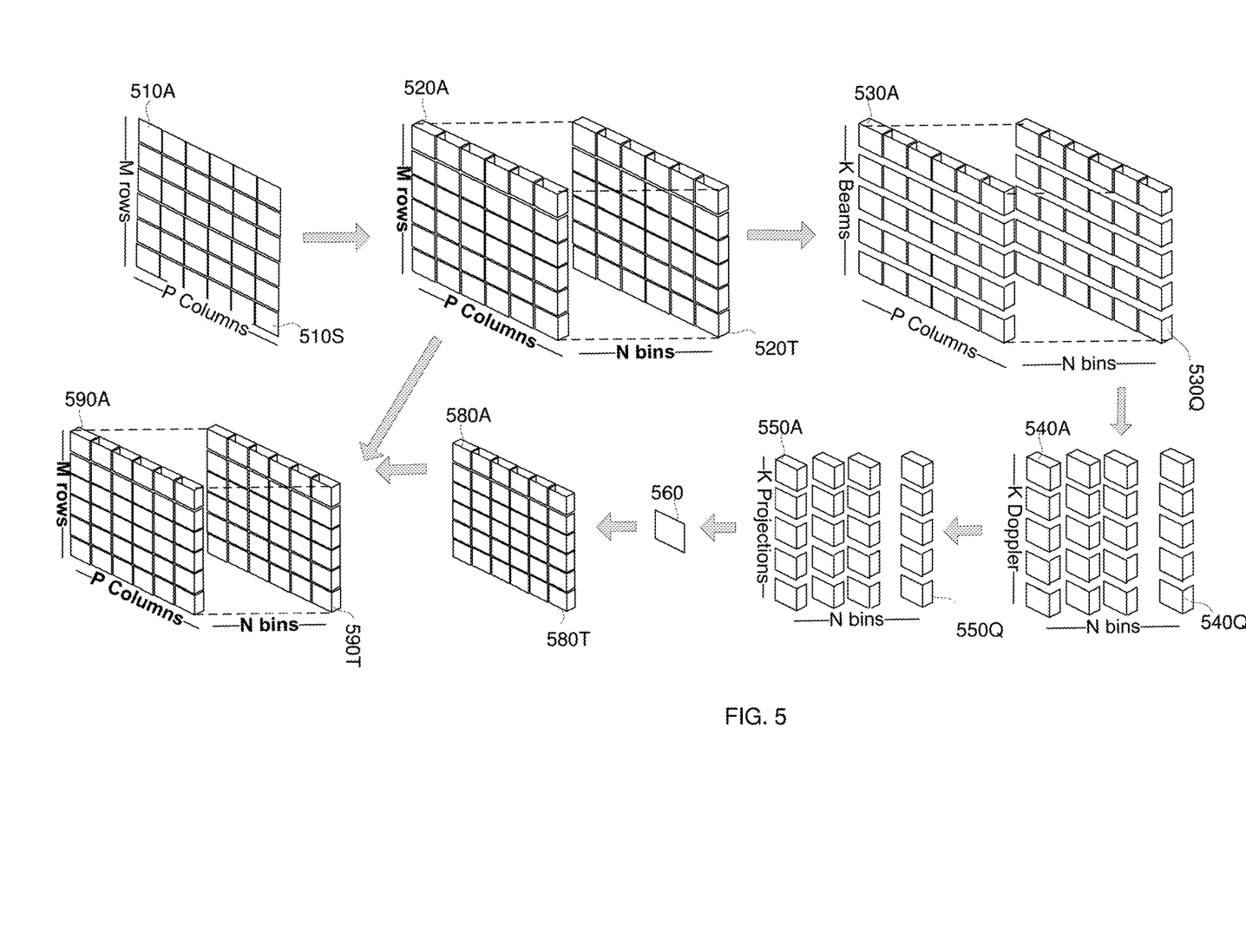
FIG. 5 is a graphical representation of Doppler correction in an embodiment.

FIG. 5 is a graphical representation of example Doppler correction in an embodiment. The Doppler correction may be employed in an integrated circuit or on a device. Shown there are: The antenna elements 510A-S arranged in an array of M rows and P columns represent the P time switching instance. Thus an M×P radar signals are received on the receiving antenna array. The data point's 520A-T represents M×P radar signals sampled at N samples per received radar signal, thus, the data point's 520A-T shown comprising M×P×N data points. For example, in radar system employing frequency modulated continuous wave (FMCW) radar signal, N time samples will produce N range bins after fast Fourier transform. Since all the beam forming operations are carried out after the FFT, the N denotes the range bins. The beams 530A-Q represents K beams generated for set of M antenna elements across P time switching sequence, Doppler estimated frequencies 540A-Q determined from the beams 530A-K, The normalised Doppler frequencies 550A-Q, Self-velocity 560, correction vectors 580A-T, and corrected data point's 590A-S.

The antenna elements 510A-S receives the radar signal reflected from one or more objects or from terrain. The antenna elements may be implemented on a printed circuit board as an array of copper conductor patches. Though shown as two dimensional arrays, the antenna elements 510A-S may be arranged in one dimensional, and/or set of antenna arrays, without deviating from the spirit of the disclosure.

The data points 520A-T corresponds to digitised signal received on the antenna elements 510A-S. The digitisation block 320 may generate data points 520A-S employing analog front end circuitry, analog to digital converter, FFT, for example.

The beams 530A-Q are generated by summing the data point of M rows. Alternatively, a K point fast Fourier transform of the M data point in each column P provides K beams with angle θ1-θK made normal to the array for every range bins N. Thus, the beams 530A-Q are shown comprising K×P×N beams. The first beam former 330 may be employed to generate 530A-Q number of beams.

The Doppler estimated frequencies 540A-Q is determined from the K beams across P columns (i.e, 530A-Q beams) for all the N samples (bins). Thus, Doppler estimated frequencies 540A-Q is shown comprising K×N Doppler frequencies. The object position in the K beams and its relative change in position across P time switching instances represent the movement of the object. Thus, the velocity of the object (prominent peaks for example) may be determined by measuring the distance moved with respect to time. The Doppler estimator 340 may be employed to generate the Doppler estimated frequencies 540A-Q.

The normalised Doppler frequencies 550A-Q represents the Doppler frequencies 540A-Q increased/decreased by a factor proportional to the angle of the corresponding beam. In one embodiment, the normalised Doppler frequency 550A-Q are obtained by dividing the Doppler estimated frequencies 540A-Q with the corresponding Doppler projection vectors. For example, The Doppler projection vectors are a factor by with the velocities/Doppler frequencies 540A-Q increase/decrease when viewed normal to the array 510A-S. Alternatively, the Doppler projection vectors represents the factor measured with respect to the angle made by the respective beams 530A-Q. In one embodiment, the Doppler projection vector is computed as cosine of an angle (θ). Thus, for K number of beams in the K direction, a corresponding K number of projection vectors are generated. For example, a beam at angle of q with respect to the array normal gives a projection vector of cos (q). In other words, the normalised Doppler frequencies 550A-Q represents the projection of these frequencies on the normal to the array.

The self-velocity 560 represents the velocity of the antenna array. In one embodiment, the maximum value (peak) of the Doppler histogram or the maximum probable value of 550A-Q is considered as the self-velocity of the antenna array. The self-velocity so computed is substantially accurate under the condition when the antenna array (the radar unit mounted vehicle) is considered as the only object moving. Thus, the self-velocity estimation is more accurate when the radar system is employed for terrain mapping.

The self-velocity correction vectors 580A-T represents the value to be corrected in each data point for more accurate object detection and in particular for terrain mapping. In one embodiment self-velocity correction factor "A" is computed using relation:

$$A = e^{-j2p*Tchirpdelay*fdproj}$$

In that, "$T_{chirpdelay}$" representing the duration between the two successive chirps transmitted (time elapsed between the start of a chirp to the start of next chirp), "fdproj" is computed using relation: fdproj=fd*L. In that, fd representing self-velocity 560, and L representing a parameter as a function of the angle φ. In one embodiment, the L is set to equal to cos (φ). Wherein the φ represents the angle made by the reconstructed beams.

The corrected data points 590 A-T represents the data point provided for final object detection and/terrain mapping. The corrected data points 590A-T may be computed as corrected data points=data points*A. In one embodiment, data points of every time switched instance per direction is multiplied by the same correction factor. That is, the data points 1×1×N are multiplied by correction factor 580A, the data points 1×2×N are multiplied by correction factor 580B and so on. The corrected data points 590 A-T is provided for terrain mapping and object detection.

The Doppler estimator 340 generates Doppler estimated frequencies 540A-K, the Doppler projection compensator 350 generates normalised Doppler frequencies 550A-K, the self-velocity estimator 360 generates the self-velocity 570, and the terrain beamforming correction unit 370 generates the self-velocity correction vectors 580A-T and corrected data points 590.

The first beam former 330, Doppler estimator 340, Doppler projection compensator 350, self-velocity estimator 360, terrain beamforming correction unit 370, terrain beam former 380, and terrain mapping unit 390 may be implemented by employing arithmetic and logic units such as FFT core, multipliers, adder, shift registers to perform the desired mathematical operations. In embodiment, the Doppler frequency may be corrected by employing a processor executing a set of instruction sequentially.

Figure 6:
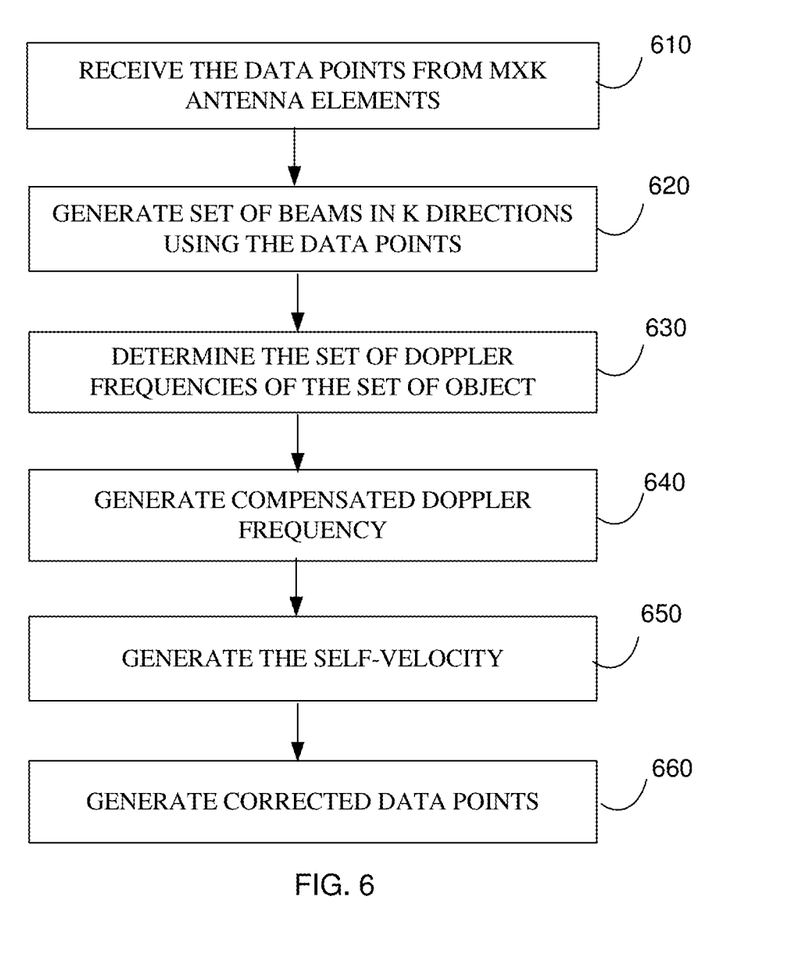
FIG. 6 illustrates an example set operations for Doppler correction in an embodiment.

FIG. 6 illustrates an example set operations for Doppler correction in an embodiment. The operation is described with reference to forgoing descriptions. In block 610, the processor 250 receives the M×P×N data points from antenna elements. In block 620, the processor 250 generates K×P×N beams using the data points. In block 630, the processor 250 detects a set of objects from the K×P×N beams. In block 640, the processor 250 determines the K×N Doppler frequencies using the data points received at P time instances. In block 650, the processor 250 generates K×N compensated Doppler frequencies by factoring the angle made by the object to the normal of the antenna array. In block 660, the processor 250 generates the self-velocity from the compensated Doppler frequencies. In block 670, the processor 250 generates M×P×N corrected data points using the self-velocity. The corrected data points are provided for object detection.

Thus, the Doppler correction as described in the above sections are independent of the number of object being detected and enhance the accuracy in case of terrain mapping applications. Further, the self-velocity computed may be employed in navigation and such control application to provide higher precession control.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A method in a time switched multiple input and multiple output (MIMO) radar system comprising:
   receiving (610) from an antenna array a plurality of data points representing a radar signal reflected from plurality of objects;
   forming (620) a first set of beams from the plurality of data points, wherein the first set of beams are making a first set angles with a normal to the antenna array;
   detecting a set of objects (410A-L) from the first set of beams;
   determining (630) a set of Doppler frequencies of the set of objects;
   computing (650) a self-velocity representing a velocity of the antenna array using the set of Doppler frequencies and the first set of angles; and
   correcting (660) the plurality of data points using the self-velocity and a second set of angles to generate plurality of corrected data points.

2. The method of claim 1, wherein the plurality of data points comprising a matrix of M×P×N data points, in that, the M representing the number of antenna element in the antenna array, P representing number of time switched radar signals, and N representing the number of range bins, and the first set of beams comprising K×P×N number of beams wherein the K representing number of beams formed from M antenna elements for every P×N.

3. The method of claim 1, further comprising determining a set of projection vectors from the first set of angles and dividing the first set of Doppler frequencies from the corresponding one of the projection vectors to generate a set of projected Doppler frequencies.

4. The method of claim 3, further comprising selecting a maximum probable value within the set of projected Doppler frequency as the self-velocity.

5. The method of claim 4, further comprising:
   forming a set of projections of the self-velocity, wherein the set of projections are making a second set of angles with the self-velocity;
   generating plurality of correction factors from the set of projections; and
   correcting the plurality of data points with the plurality of correction factors.

6. The method of claim 5, further comprising:
   generating the plurality of correction factors through relation: $A = e^{-j2p*Tchirpdelay*fdproj}$, in that, A representing a correction factor in the plurality of correction factor, fdproj representing a projection and Tchirpdelay representing the time elapsed between the start of a chirp to the start of next chirp; and generating the projections using relation: fdproj=fd*L, in that, fd representing the self velocity, L representing cosine of an angle in the second set of the angles.

7. The method of claim 6, further comprising multiplying plurality of data points of every time switched instance P per direction by the same correction factor.

8. Method of claim 7, wherein plurality of data points comprising a matrix of M×P×N data points, in that, the M representing the number of antenna element in the antenna array, P representing number of time switched radar signals, and N representing the number of range bins, and the first set of beams comprising K×P×N number of beams wherein the K representing number of beams formed from M antenna elements for every P×N.

* * * * *